UNITED STATES PATENT OFFICE.

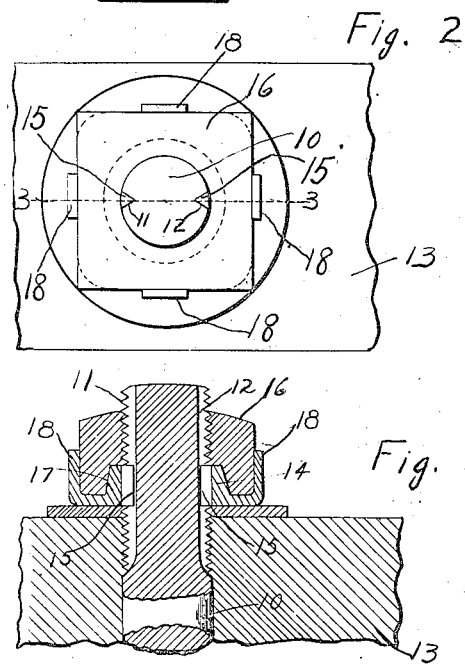

ALVIE C. WOODRUFF, OF JUNTURA, OREGON.

NUT-LOCK.

938,932.	Specification of Letters Patent.	Patented Nov. 2, 1909.

Application filed April 19, 1909. Serial No. 490,871.

*To all whom it may concern:*

Be it known that I, ALVIE C. WOODRUFF, a citizen of the United States, residing at Juntura, in the county of Malheur, State of Oregon, have invented certain new and useful Improvements in Nut-Locks; and I do hereby declare the following to be a full, clear, and exact description of the invention, such as will enable others skilled in the art to which it appertains to make and use the same.

This invention relates to lock nuts, and has for one of its objects to simplify and improve the construction and increase the efficiency and utility of devices of this character.

With this and other objects in view, the invention consists in certain novel features of construction as hereafter shown and described and then specifically pointed out in the claims, and in the drawings illustrative of the preferred embodiment of the invention, Figure 1 is a side elevation of the improved device applied. Fig. 2 is a plan view of the same. Fig. 3 is a section on the line 3—3 of Fig. 2. Fig. 4 is a vertical section of the nut. Fig. 5 is a plan view of the locking washer. Fig. 6 is a section on the line 6—6 of Fig. 5.

In the improved device the bolt represented at 10 is provided with one or more channels extending longitudinally thereof and transversely of the threads. Any number of the channels may be employed, but for the purpose of illustration two are shown and represented at 11—12, and located at opposite sides of the bolt.

The body through which the bolt extends is indicated at 13, and bearing upon this body and surrounding the nut is a locking element formed of a sleeve 14 surrounding the threaded portion of the bolt and projecting above the face of the washer and provided with inwardly directed ribs 15 engaging in the channels 11—12, to prevent the sleeve from being rotated upon the bolt while at the same time free to slide longitudinally thereof over the threads. The outer face of the sleeve 14 is preferably conical as shown, and the nut represented at 16 is provided with a cavity 17 conical in form to correspond to the conical outer face of the sleeve 14 and fitting over the same when the nut is in position upon the bolt, as shown. The sleeve 14 is provided with a plurality of radial leaves or plates 18 adapted to bend up around the nut after the same is turned home, as shown. With a device thus constructed it will be obvious that the sleeve 14 with its leaves 18 distended will first be placed over the bolt and upon the body 13, and the nut 16 then turned home over the bolt with the conical recess 17 engaging over the sleeve. After the nut has been tightened to the required extent the leaves 18 are bent up around the nut, thus locking it firmly in position and preventing retrograde movement thereof. The conical sleeve is an important element of the invention, and increases the strength of the device materially and correspondingly increases the utility and effectiveness of the locking action without materially increasing the expense or weight. By employing the sleeve with its conical outer face, the grip of the ribs 15 is materially increased, and the strength of the device thus correspondingly increased.

What is claimed is:—

In a nut lock, a bolt having longitudinal channels in the threaded portion, a nut engaging said bolt and provided with a recess in one face, a washer upon which said nut bears having a plurality of radially extending wings bendable over the sides of the nut, and also having a sleeve projecting above the face of the washer and engaging in the recess of the nut, said sleeve having inwardly directed ribs engaging in the channels of the bolt.

In testimony whereof, I affix my signature, in presence of two witnesses.

ALVIE C. WOODRUFF.

Witnesses:
L. V. SMITH,
R. C. CURREY.